|   United States Patent [19]   | [11] | Patent Number: | 5,051,178 |
|---|---|---|---|
| Uemura et al. | [45] | Date of Patent: | Sep. 24, 1991 |

[54] PROCESS OF PRODUCING COMPOSITE SEMIPERMEABLE MEMBRANE

[75] Inventors: Tadahiro Uemura, Kyoto; Hideo Fujimaki, Shiga; Toshihiro Ikeda, Otsu, all of Japan

[73] Assignee: Toray Industries, Inc., Japan

[21] Appl. No.: 415,347

[22] PCT Filed: Jan. 10, 1989

[86] PCT No.: PCT/JP89/00019

§ 371 Date: Sep. 7, 1989

§ 102(e) Date: Sep. 7, 1989

[87] PCT Pub. No.: WO89/06153

PCT Pub. Date: Jul. 13, 1989

[30] Foreign Application Priority Data

Jan. 11, 1988 [JP] Japan ................................. 63-4317

[51] Int. Cl.$^5$ ............................................. B01D 61/00
[52] U.S. Cl. ................................. 210/500.38; 210/490; 210/654; 427/243; 427/244; 427/245; 264/183; 264/347
[58] Field of Search ................... 210/500.37, 500.38, 210/500.28, 490, 654; 427/243, 244, 245, 246, 247; 264/183, 347

[56] References Cited

U.S. PATENT DOCUMENTS

| 4,626,468 | 12/1986 | Sundet | 210/500.38 |
| 4,643,829 | 2/1987 | Sundet | 210/500.38 |
| 4,661,254 | 4/1987 | Zupancic | 210/500.38 |
| 4,749,488 | 6/1988 | Arthur | 210/500.38 |
| 4,761,234 | 8/1988 | Uemura | 210/500.38 |

Primary Examiner—Jay H. Woo
Assistant Examiner—Jeremiah F. Durkin, II
Attorney, Agent, or Firm—Austin R. Miller

[57] ABSTRACT

Alkyldiamine, 1,3,5-trihydroxybenzene or 1,3-dihydroxybenzene is added as a copolymerization component to a polyfunctional aromatic amine component in the amount of 1-20% by weight with respect to the polyfunctional aromatic amine in producing a composite semipermeable membrane by laminating on a microporous substrate a polyamide formed by interfacial polycondensation between a polyfunctional aromatic amine and a polyfunctional acid halide. The composite semipermeable membrane has improved oxidation resistance while retaining excellent separation selectivity and high permeability of the crosslinked polyamide-based composite semipermeable membrane. The composite semipermeable membrane is used for desalination of brackish and sea water.

6 Claims, No Drawings

PROCESS OF PRODUCING COMPOSITE SEMIPERMEABLE MEMBRANE

TECHNICAL FIELD

This invention relates to a process of producing a composite semipermeable membrane which is useful for selective separation of liquid mixtures, especially for desalination of brackish and sea water.

BACKGROUND ART

Composite semipermeable membranes prepared by covering a microporous substrate with a ultra-thin membrane of a crosslinked polyamide obtained by interfacial polycondensation reaction between a polyfunctional aromatic amine and a polyfunctional acid halide are now drawing attention as reverse osmosis membranes with high permeability and high separation selectivity. Preparation of the composite membrane by the interfacial polycondensation reaction between the polyfunctional aromatic amine and the polyfunctional acid halide is disclosed in, for example, U.S. Pat. Nos. 4,277,344, 4,520,044, 4,529,646, 4,626,468, 4,643,829, 4,661,254, 4,749,488 and 4,761,234.

On the other hand, a composite semipermeable membrane prepared by laminating a ultra-thin membrane of a polyamide obtained by interfacial polycondensation reaction between ethylenediamine and a polyfunctional acid halide on a microporous substrate is known as a reverse osmosis membrane with excellent oxidation resistance and high separation selectivity, which semipermeable membrane is disclosed in, for example, European Patent Publication No. 0,085,111.

Although the composite semipermeable membrane prepared by covering a microporous substrate with an ultra-thin membrane of a crosslinked polyamide obtained by interfacial polycondensation reaction between a polyfunctional aromatic amine and a polyfunctional acid halide has excellent permeability and separation selectivity, it does not have a satisfactory oxidation resistance which is required for a practical reverse osmosis membrane. That is, in a practical reverse osmosis process, the system is usually washed with an oxidant for removing organic substances fixed in the system, so that the reverse osmosis membrane is desired to have resistance against the oxidant, expecially against free chlorine.

On the other hand, although the composite semipermeable membrane prepared by laminating an ultra-thin membrane of a polyamide obtained by interfacial polycondensation reaction between ethylenediamine and a polyfunctional acid halide on a microporous substrate has excellent oxidation resistance and separation selectivity, it does not have the satisfactory permeability required for a practical reverse osmosis membrane. The permeability is one of the most important factors for the economic efficiency of a practical reverse osmosis process. Thus, a reverse osmosis membrane which has both high permeability and high oxidation resistance is desired.

DISCLOSURE OF THE INVENTION

The object of the present invention is to provide a process of producing a composite semipermeable membrane which has both high oxidation resistance and high permeability, thereby overcoming the above-mentioned problems in the prior art.

That is, the present invention provides a process of producing a composite semipermeable membrane comprising the step of forming on a microporous substrate an ultra-thin membrane containing as a major component a crosslinked polyamide obtained by interfacial polycondensation reaction between a polyfunctional aromatic amine having not less than 2 amino groups in the molecule and a polyfunctional acid halide having not less than 2 halogenated carbonyl groups in the molecule, to form a composite semipermeable membrane. The polycondensation reaction is performed in the presence of a copolymerization component comprising. at least one member selected from the group consisting of 1,3,5-trihydroxybenzene, 1,3-dihydroxybenzene and an alkyldiamine of the formula (1):

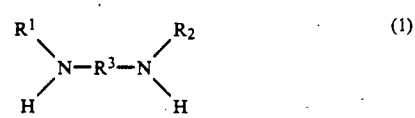

wherein $R^1$ and $R^2$ independently represent $C_1$–$C_3$ alkyl, $C_6$ phenyl or hydrogen, $R^3$ represents $C_1$–$C_7$ straight chain alkyl group which may have one or more side chains or $C_3$–$C_7$ cycloalkyl group which may have one or more side chains).

The latter copolymerization is added to the polyfunctional aromatic amine as a copolymerization component in the amount of not less than 1% by weight to not more than 20% by weight with respect to the polyfunctional aromatic amine when the interfacial polycondensation reaction is carried out.

By the process of producing a composite semipermeable membrane of the present invention, the oxidation resistance of the composite semipermeable membrane is largely improved while substantially retaining the high permeability and high separation selectivity of the crosslinked aramide-based composite semipermeable membrane. That is, by the process of the present invention, a composite semipermeable membrane having excellent oxidation resistance as well as high permeability and high separation selectivity can be produced.

BEST MODE FOR CARRYING OUT THE INVENTION

The composite semipermeable membrane produced by the process of the present invention has an ultra-thin membrane substantially having separation capability laminated on a microporous substrate which substantially does not have separation capability. The ultra-thin membrane comprises as a major component a crosslinked polyamide obtained by an interfacial polycondensation reaction of a polyfunctional aromatic amine and at least one compound selected from the group consisting of alkyldiamine, 1,3,5-trihydroxybenzene and 1,3-dihydroxybenzene with a polyfunctional acid halide.

As the polyfunctional aromatic amine, those having two or more amino groups in a molecule, for example, m-phenylenediamine, p-phenylenediamine and 1,3,5-triaminobenzene may be employed. The above-described aromatic amine may be employed individually or in combination. In particular, by employing 1,3,5-triaminobenzene and m-phenylenediamine in combination, a membrane with excellent permeability and separation selectivity may be obtained. The aromatic amine is usually dissolved in water and forms an ultra-thin membrane containing crosslinked polyamide as the major constituent by interfacial polycondensation upon contact with an acid halide hereinbelow described.

In the process of the present invention, at least one copolymerization component selected from the group consisting of any of the aforementioned alkyldiamines, 1,3,5-trihydroxybenzene and 1,3-dihydroxybenzene is added to the polyfunctional aromatic amine in the amount of not less than 1% by weight to not more than 20% by weight, whereby the oxidation resistance of the composite semipermeable membrane is prominently improved. If the amount of the alkyldiamine, 1,3,5-trihydroxybenzene or 1,3-dihydroxybenzene is less than 1% by weight, the improvement of the oxidation resistance is insufficient, and if it is more than 20% by weight, the permeability is poor. In view of the oxidation resistance and the permeability, the preferred range is 2-15% by weight.

The alkyldiamine is represented by the formula (1):

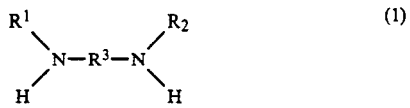

In the formula (1), $R^1$ and $R^2$ independently represent $C_1$-$C_3$ alkyl, $C_6$ phenyl or hydrogen, $R^3$ represents $C_1$-$C_7$ straight chain alkyl group which may have one or more side chains or $C_3$-$C_7$ cycloalkyl group which may have one or more side chains. Examples of the alkyldiamine include ethylenediamine, 1,2-propanediamine, 1,3-propanediamine, hexamethylenediamine, 1,2-cyclohexanediamine, 1,3-cyclohexanediamine, 1,4-cyclohexanediamine, N-methylethylenediamine, N,N'-dimethylethylenediamine, N-phenylethylenediamine and the like. These alkyldiamines may be employed in combination as long as the total thereof is not less than 1% by weight and not more than 20% by weight with respect to the aromatic amine. In view of the cost, high permeability, high salt rejection and oxidation resistance of the produced membrane, ethylenediamine is most preferred. In place of the alkyldiamine, 1,3,5-trihydroxybenzene or 1,3-dihydroxybenzene may be employed. Among these, in view of the permeability and separation selectivity of the membrane, 1,3,5-trihydroxybenzene is preferred. These hydroxybenzenes may be employed in combination with the alkyldiamine. In this case, the total thereof is not less than 1% by weight and not more than 20% by weight with respect to the aromatic amine.

The polyfunctional acid halide is an acid halide which has two or more halogenated carbonyl groups in one molecule, which yields a polyamide by an interfacial polycondensation reaction with the above-described polyfunctional aromatic amine. Examples of the preferred polyfunctional acid halide include halides of alicyclic and aromatic acid such as cyclohexane-1,3,5-tricarboxylic acid, cyclohexane-1,3-dicarboxylic acid, cyclohexane-1,4-dicarboxylic acid, benzene-1,3,5-tricarboxylic acid, benzene-1,3-dicarboxylic acid, and benzene-1,4-dicarboxylic acid.

In view of the reactivity with the polyfunctional aromatic amine, the polyfunctional acid halide may preferably be a polyfunctional acid chloride and in view of the separation selectivity and heat resistance of the membrane, the polyfunctional acid halide may preferably be a polyfunctional aromatic acid chloride. Thus, it is most preferable to employ benzene-1,3,5-tricarboxylic acid chloride, benzene-1,3-dicarboxylic acid chloride and/or benzene-1,4-dicarboxylic acid chloride individually or in combination as the polyfunctional acid halide.

The microporous substrate substantially does not have separation capability and is employed for reinforcing the ultra-thin membrane substantially having separation capability. The microporous substrate has micro pores of a uniform size or has micro pores of which the pore size is gradually enlarged from one surface to another surface, and the pore size at the surface may preferably be not larger than 100 nm. Such a microporous substrate may be selected from commercially available materials such as "Millipore Filter VSWP" (trade name) commercially available from Millipore Co., Ltd. and "Ultrafilter UK10" (trade name) commercially available from Toyo Roshi Co., Ltd. Alternatively, the microporous substrate may preferably be, for example, a polysulfone microporous substrate reinforced with a cloth containing as a major component at least one of the polyesters and aromatic polyamides. Such a substrate may be prepared in accordance with "Office of Saline Water Research and Development Progress Report" No. 359 (1968). As the material for forming the substrate, homopolymer or the blended polymers of, such as, polysulfone, cellulose acetate, cellulose nitrate and polyvinyl chloride may be employed. Among these, polysulfone is most preferred since it has chemical, mechanical and thermal stability. In particular, a polysulfone having a repeating unit [A], by which pore size is easily controlled and which has a high dimensional stability is preferred:

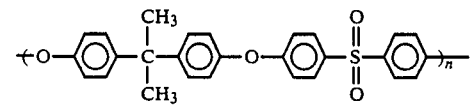

By casting a solution of this polysulfone in dimethylformamide (DMF) on a densely woven polyester cloth or a non-woven fabric to a prescribed thickness, and wet-coagulating the cast solution in an aqueous solution containing 0.5% by weight of sodium dodecyl sulfate and 2% by weight of DMF, a microporous substrate which has micro pores with a diameter of not larger than 10 nm at most area of the surface may be obtained.

The process of producing the composite semipermeable membrane will now be described in detail.

The ultra-thin membrane with substantial separation capability in the composite semipermeable membrane is formed by an interfacial polycondensation reaction using an aqueous solution containing the above-described polyfunctional aromatic amine and at least one copolymerization compound selected from the group consisting of the previously identified alkyldiamine, 1,3,5-trihydroxybenzene and 1,3-dihydroxybenzene, and an organic solution of the above-described polyfunctional acid halide in an organic solvent which is immiscible with water.

The concentration of the aromatic amine in the polyfunctional aromatic amine solution may preferably be 0.1-10% by weight, more preferably 0.5-5.0% by weight. The concentration of the copolymerization compound selected from the group consisting of alkyldiamine, 1,3,5-trihydroxybenzene and 1,3-dihydroxybenzene may preferably be 0.01-0.1% by weight, more preferably 0.03-0.15% by weight, and the compound is added in the amount of not less than 1% by weight and not more than 20% by weight of the aromatic amine. The aqueous solution may contain a surfactant, organic solvent, alkaline compound, anti-oxidant and the like as long as it does not adversely affect the interfacial reaction between the amino compound and the polyfunctional acid halide, and the solution preferably has a pH of 6-13, more preferably 10-13 in view of the reactivity of the alkyldiamine. Further, the aqueous solution may contain a water-soluble macromolecular compound such as water-soluble polyvinyl alcohol in an amount not adversely affecting the performance.

The application of the aqueous amine solution on the surface of the microporous substrate may be conducted by any appropriate method as long as the surface of the microporous substrate is covered with the aqueous amine solution uniformly and continuously. For example, the aqueous solution may be coated on the surface of the microporous substrate or the microporous substrate may be immersed in the aqueous solution.

Any aqueous amine solution applied in excess is removed in a liquid-removing step. The excess solution may be removed by, for example, vertically holding the membrane so that the excess solution naturally drops from the membrane. It is preferable not to leave a drop on the membrane. Although the membrane may be dried after the excess solution is removed, this does not always bring about preferred results.

Then the organic solution of the above-described polyfunctional acid halide in the organic solution is applied to the membrane to form the ultra-thin membrane containing crosslinked polyamide as the major component by the interfacial polycondensation.

The concentration of the polyfunctional acid halide in the organic solution may preferably be 0.01-10% by weight, more preferably 0.02-2% by weight. In some cases, it is preferred that the organic solution contain an acylation catalyst such as DMF since the interfacial polycondensation is enhanced.

The organic solvent is required to be immiscible with water, to dissolve the acid halide and not to destroy the microporous substrate. Any organic solvent satisfying these requirements, which is inert to the amino compound and to the acid halide may be employed. Preferred examples of the organic solvent include hydrocarbons, trichlorotrifluoroethane and the like. In view of the reaction rate and the volatility of the solvent, n-hexane and trichlorotrifluoroethane are preferred, and in view of the inflammability of the solvent, trichlorotrifluoroethane is most preferred.

The polyfunctional acid halide may be contacted with the aqueous phase of the amino compound in the same manner as the application of the aqueous amino compound solution on the microporous substrate.

The thus prepared composite semipermeable membrane exhibits satisfactory performance as it is. However, by immersing the thus prepared composite semipermeable membrane in an aqueous solution containing chlorine with a pH of 6-13, the performance of the membrane, especially the salt rejection and the water flux may be improved. Examples of the chlorine-generating reagent include chlorine gas, bleaching powder, sodium hypochlorite, chlorine dioxide, Chloramine B, Chloramine T, Halazone, dichlorodimethylhydantoin, and isocyanuric acid chloride as well as salts thereof. The concentration thereof may preferably be determined based on the oxidation power thereof. Among the above-mentioned chlorine-generating reagents, aqueous sodium hypochlorite solution is most preferred in view of the ease of handling. There is an important relationship between the oxidation power and pH of the chlorine-containing aqueous solution. For example, in case of aqueous sodium hypochlorite solution, if the pH is less than 6, the solution does not have a sufficient oxidation power and if the pH is more than 13, the amide bond may be hydrolyzed. If such a chlorine treatment is carried out, a dechlorination step is performed thereafter. The dechlorination may be conducted by, for example, contacting the membrane with a reducing agent such as a bisulfite salts.

The invention will now be described based on the examples thereof. It should be noted that the present invention is not limited to the examples.

In the examples, the solute rejection was calculated by the following equation:

$$\text{Solute Rejection } [\%] = \left(1 - \frac{Y}{X}\right) \times 100$$

wherein X represents the concentration of solute in the supplied liquid and Y represents the concentration of the solute in the permeate.

The water flux indicates the amount of water ($m^3$) which passed through the membrane per 1 $m^2$ of the membrane per day.

REFERENCE EXAMPLE 1

The fiber-reinforced polysulfone substrate used in the present invention was prepared by the following process:

A taffeta sizing 30 cm (longitudinal direction) ×20 cm (lateral direction) consisting of polyester fibers (both of the warp and weft multifilament yarn of 150 denier, warp density: 90 warps/inch, weft density: 67 wefts/inch, 160 μm thickness) was fixed on a glass plate and 15% by weight solution of polysulfone (Udel-P3500 commercially available from Union Carbide) in dimethylformamide (DMF) was cast thereon at room temperature (20° C.) to a thickness of 200 μm. The resultant was immediately immersed in pure water and was left to stand for 5 minutes to prepare a fiber-reinforced polysulfone substrate (hereinafter referred to as "FR-PS substrate" for short). The permeation coefficient for water of the thus obtained FR-PS substrate (210-215 μm thickness) measured under a pressure of 1 kg/cm² and at room temperature (25° C.) was 0.005-0.01 g/cm² sec atm.

EXAMPLE 1

The FR-PS substrate obtained in Reference Example 1 was immersed in an aqueous amine solution with a composition shown in Table 1 for one minute. The substrate was gradually drawn up in the vertical direction to remove the excess aqueous solution from the surface of the substrate. Then the polyfunctional acid chloride in trichlorotrifluoroethane containing 300 ppm of DMF was applied to the surface of the membrane so that the entire surface of the membrane was wetted completely, and the membrane was left to stand for one minute. After removing the excess solution by vertically holding the membrane, the membrane was immersed in 0.2% by weight aqueous sodium carbonate solution for 5 minutes.

The thus prepared composite semipermeable membrane was subjected to a reverse osmosis test under a pressure of 15 kg/cm² at 25° C. using 1500 ppm of aqueous sodium chloride solution of was pH was adjusted to 6.5. The membrane performance shown in Table 1 was obtained. The meaning of the abbreviations in the Table is as follows:

ED: ethylenediamine
TAB: 1,3,5-triaminobenzene
m-PDA: meta-phenylenediamine
TMC: benzene-1,3,5-tricarboxylic acid chloride (trimesoyl chloride)
TPC: terephthaloyl chloride

EXAMPLE 2

A composite semipermeable membrane was produced in the same manner as in Example 1 except that 0.05% by weight of ethylenediamine was added. As a result, membrane performance shown in Table 1 was obtained.

EXAMPLE 3

After immersing the membrane in 0.2% by weight aqueous sodium carbonate solution for 5 minutes in Example 1, the membrane was further immersed in an aqueous solution with a pH of 7 containing 600 ppm of sodium hypochlorite and 0.2% by weight of potassium phosphate for 2 minutes, followed by washing with tapped water.

The thus obtained composite semipermeable membrane was subjected to the reverse osmosis test as in Example 1 to obtain the membrane performance shown in Table 1.

EXAMPLES 4-7

A composite semipermeable membrane was produced in the same manner as in Example 3 except that the amount of the amine component and the acid halide was changed to that shown in Table 1. As a result, the membrane performance shown in Table 1 was obtained.

COMPARATIVE EXAMPLE 1

A composite semipermeable membrane was produced in the same manner as in Example 3 except that the amount of the added ethylenediamine was 0.5% by weight. As a result, the membrane performance shown in Table 1 was obtained.

EXAMPLE 8

The membrane obtained in Example 1 was operated under 100 ppm of chlorine, pH 6.5, at 25° C. for 45 hours and then the membrane was washed with citric acid. As a result, the performance of the membrane was changed as shown in Table 2. In Table 2, the increase ratio of the salt permeation means the ratio of the salt permeation before and after the operation in the presence of chlorine, and the salt permeation (%) means (100 - salt rejection) (%).

EXAMPLE 9

The membrane obtained in Example 4 was subjected to operation in the presence of chlorine in the same manner as in Example 8. As a result, the performance was changed to that shown in Table 2.

EXAMPLE 10

The membrane obtained in Example 7 was subjected to operation in the presence of chlorine in the same manner as in Example 8. As a result, the performance was changed to that shown in Table 2.

COMPARATIVE EXAMPLE 2

A composite semipermeable membrane was produced in the same manner as in Example 3 except that the ethylenediamine was not added. As a result, the membrane performance shown in Table 1 was obtained. Further, the membrane was subjected to the operation in the presence of chlorine as in Example 8. As a result, the membrane performance was changed to that shown in Table 2.

COMPARATIVE EXAMPLE 3

A composite semipermeable membrane was produced in the same manner as in Example 7 except that the ethylenediamine was not added. As a result, the membrane performance shown in Table 1 was obtained. Further, the membrane was subjected to the operation in the presence of chlorine as in Example 8. As a result, the membrane performance was changed to that shown in Table 2.

EXAMPLE 11-16

A composite semipermeable membrane was produced in the same manner as in Example 3 except that 0.05% by weight of 1,3-propanediamine, 1,2-cyclohexanediamine, N-methylenethylenediamine, N,N'-dimethylethylenediamine, N-phenylethylenediamine or 1,3,5-trihydroxybenzene was used in place of ethylenediamine. As a result, the membrane performance shown in Table 3 was obtained. Further, the membrane was subjected to the operation in the presence of chlorine as in Example 8. As a result, the membrane performance was changed to that shown in Table 3.

As is apparent from the comparison between the Comparative Example 2 and Examples 1-6, 8, 9 and 11-16, and between the Comparative Example 3 and Examples 7 and 10, by adding the alkyldiamine or 1,3,5-trihydroxybenzene to the aqueous amine solution, the production of a composite semipermeable membrane with excellent oxidation resistance was attached while keeping the high desalination performance and the permeability.

Further, as is apparent from the comparison between the Comparative Example 1 and the Examples 1-6, if the amount of the added alkyldiamine exceeds 20% by weight, the permeability is reduced, so that the practically sufficient permeability was not obtained.

TABLE 1

| | Amine Component | | | Acid Halide | | Membrane Performance | |
|---|---|---|---|---|---|---|---|
| | ED wt % | m-PDA wt % | TAB wt % | TMC wt % | TPC wt % | Salt Rejection % | Water Flux m³/m² · day |
| Example 1 | 0.03 | 1.5 | 0.5 | 0.05 | 0.05 | 99.35 | 1.03 |
| Example 2 | 0.05 | 1.5 | 0.5 | 0.05 | 0.05 | 99.30 | 1.01 |
| Example 3 | 0.03 | 1.5 | 0.5 | 0.05 | 0.05 | 99.79 | 1.25 |
| Example 4 | 0.05 | 1.5 | 0.5 | 0.05 | 0.05 | 99.76 | 1.24 |
| Example 5 | 0.10 | 1.5 | 0.5 | 0.05 | 0.05 | 99.50 | 1.27 |

TABLE 1-continued

| | Amine Component | | | Acid Halide | | Membrane Performance | |
|---|---|---|---|---|---|---|---|
| | ED wt % | m-PDA wt % | TAB wt % | TMC wt % | TPC wt % | Salt Rejection % | Water Flux m³/m² · day |
| Example 6 | 0.20 | 1.5 | 0.5 | 0.05 | 0.05 | 99.48 | 1.05 |
| Example 7 | 0.05 | 2.0 | 0 | 0.1 | 0 | 99.30 | 1.01 |
| Comparative Example 1 | 0.50 | 1.5 | 0.5 | 0.05 | 0.05 | 96.80 | 0.68 |
| Comparative Example 2 | 0 | 1.5 | 0.5 | 0.05 | 0.05 | 99.78 | 1.22 |
| Comparative Example 3 | 0 | 2.0 | 0 | 0.1 | 0 | 99.32 | 1.05 |

TABLE 2

| | Salt Rejection % | Water Flux m³/m² · day | Increase Ratio of Salt Permeation |
|---|---|---|---|
| Example 8 | 98.81 | 1.10 | 1.83 |
| Example 9 | 99.51 | 1.29 | 2.04 |
| Example 10 | 98.90 | 1.10 | 1.57 |
| Comparative Example 2 | 95.35 | 1.10 | 21.1 |
| Comparative Example 3 | 91.70 | 1.56 | 12.2 |

TABLE 3

| | Alkyldiamine | Before Operation in the Presence of Chlorine | | After Operation in the Presence of Chlorine | | Increase Ratio of Salt Permeation |
|---|---|---|---|---|---|---|
| | | Salt Rejection % | Water Flux m³/m² · day | Salt Rejection % | Water Flux m³/m² · day | |
| Example 11 | 1,3-propanediamine | 99.72 | 1.06 | 99.27 | 1.08 | 2.61 |
| Example 12 | 1,2-cyclohexanediamine | 99.76 | 0.93 | 98.42 | 1.02 | 6.58 |
| Example 13 | N-methylethylenediamine | 99.32 | 1.17 | 98.29 | 1.33 | 2.52 |
| Example 14 | N,N'-dimethylethylenediamine | 99.69 | 1.07 | 99.24 | 1.25 | 2.45 |
| Example 15 | N-phenylethylenediamine | 99.75 | 0.89 | 99.22 | 1.03 | 3.10 |
| Example 16 | 1,3,5-trihydroxybenzene | 99.75 | 1.00 | 99.27 | 0.99 | 2.92 |

INDUSTRIAL APPLICABILITY

As described above, by the process of producing a composite semipermeable membrane of the present invention, a composite semipermeable membrane with high separation selectivity and high permeation, which has excellent oxidation resistance was obtained. The process of the present invention can suitably be employed as a process of producing a practical reverse osmosis membrane.

We claim:

1. A process of producing a composite semipermeable membrane comprising the step of forming on a microporous substrate an ultra-thin membrane containing as a major component a crosslinked polyamide obtained by interfacial polycondensation reaction between a polyfunctional aromatic amine having not less than 2 amino groups in a molecule and a polyfunctional acid halide having not less than 2 halogenated carbonyl groups in a molecule, to form a composite semipermeable membrane, wherein the polycondensation reaction is conducted in the presence of a copolymerization component comprising at least one member selected from the group consisting of 1,3,5-trihydroxybenzene, 1,3-dihydroxybenzene and an alkyldiamine of the formula (1):

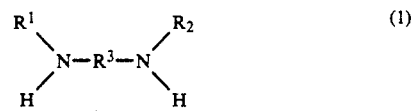

wherein $R^1$ and $R^2$ independently represent $C_1$–$C_3$ alkyl, $C_6$ phenyl or hydrogen, $R^3$ represents $C_1$–$C_7$ straight chain alkyl group which may have one or more side chains or $C_3$–$C_7$ cycloalkyl group which may have one or more side chains, and wherein said copolymerization component is added in the amount of not less than 1% by weight to not more than 20% by weight with respect to the polyfunctional aromatic amine when the interfacial polycondensation reaction is carried out.

2. The process of producing a composite semipermeable membrane of claim 1, wherein the polyfunctional aromatic amine is selected from the group consisting of m-phenylenediamine, p-phenylenediamine and 1,3,5-triaminobenzene.

3. The process of producing a composite semipermeable membrane of claim 1 wherein the polyfunctional acid halide is selected from the group consisting of benzene-1,3,5-tricarboxylic acid chloride and benzene-1,4-dicarboxylic acid chloride.

4. The process of producing a composite semipermeable membrane of claim 1, wherein the microporous substrate is made of polysulfone.

5. The process of producing a composite semipermeable membrane of claim 1, wherein the copolymerization component is ethylenediamine.

6. The process of claim 1 wherein the resulting membrane is treated with an aqueous chlorine-containing solution with a pH of 6-13.

* * * * *

UNITED STATES PATENT AND TRADEMARK OFFICE
CERTIFICATE OF CORRECTION

PATENT NO. : 5,051,178
DATED : September 24, 1991
INVENTOR(S) : Tadahiro Uemura et al It is certified that error appears in the above-identified patent and that said Letters Patent is hereby corrected as shown below:

In column 2, line 27, "chains)" should be changed to --chains--.

In column 2, line 28, delete "latter" and after "copolymerization" insert --component--.

In column 7, line 4, delete "was".

Signed and Sealed this

Thirtieth Day of March, 1993

Attest:

STEPHEN G. KUNIN

Attesting Officer    Acting Commissioner of Patents and Trademarks